United States Patent
Petterson et al.

(10) Patent No.: US 12,454,907 B2
(45) Date of Patent: Oct. 28, 2025

(54) SYSTEM AND METHOD FOR USING CONCENTRATED OXYGEN FOR GAS INTAKE INTO AN INTERNAL COMBUSTION ENGINE

(71) Applicant: H2DIESEL, INC., Lewes, DE (US)

(72) Inventors: John S. Petterson, La Jolla, CA (US); John L. Haller, La Jolla, CA (US)

(73) Assignee: H2DIESEL, INC., Lewes, DE (US)

( * ) Notice: Subject to any disclaimer, the term of this patent is extended or adjusted under 35 U.S.C. 154(b) by 0 days.

(21) Appl. No.: 18/696,020

(22) PCT Filed: Nov. 27, 2023

(86) PCT No.: PCT/US2023/081154
§ 371 (c)(1),
(2) Date: Mar. 27, 2024

(87) PCT Pub. No.: WO2024/137110
PCT Pub. Date: Jun. 27, 2024

(65) Prior Publication Data
US 2025/0305443 A1    Oct. 2, 2025

Related U.S. Application Data

(60) Provisional application No. 63/476,461, filed on Dec. 21, 2022.

(51) Int. Cl.
*F02B 47/06* (2006.01)
*F02B 47/10* (2006.01)
*F02D 19/08* (2006.01)

(52) U.S. Cl.
CPC .............. *F02B 47/06* (2013.01); *F02B 47/10* (2013.01); *F02D 19/08* (2013.01)

(58) Field of Classification Search
CPC ........... F02B 47/06; F02B 47/10; F02B 19/08
(Continued)

(56) References Cited

U.S. PATENT DOCUMENTS

| 4,259,021 A | 3/1981 | Goudy, Jr. |
| 4,334,889 A | 6/1982 | Takabayashi |

(Continued)

FOREIGN PATENT DOCUMENTS

| CN | 110240953 A | 9/2019 |
| DE | 102013003982 A1 | 9/2014 |

(Continued)

OTHER PUBLICATIONS

United States International Searching Authority, International Search Report and Written Opinion for corresponding International Application No. PCT/US2024/017795, mailed Aug. 7, 2024, 15 pages.

(Continued)

*Primary Examiner* — Hai H Huynh
(74) *Attorney, Agent, or Firm* — David R. Heckadon; Gordon Rees Scully Mansukhani LLP (57) ABSTRACT

Methods and systems for enhancing fuel combustion in an engine (which may be a standard gasoline engine, a diesel engine or a hydro-diesel engine) by using an oxygen concentrator to remove nitrogen from the air to produce a concentrated oxygen gas that is fed into a gas intake of the engine's combustion chamber. The concentrated oxygen gas and liquid fuel are combusted within the combustion chamber. In hydro-diesel embodiments, hydrogen gas is mixed into the liquid diesel fuel to form a homogeneous mixture of hydrogen gas and liquid diesel fuel entering the combustion chamber. Filler gases may also be added into the combustion chamber.

16 Claims, 3 Drawing Sheets

(58) Field of Classification Search
USPC .............. 123/1 A, 3, 27 GE, 525, 526, 527
See application file for complete search history.

(56) References Cited

U.S. PATENT DOCUMENTS

| | | | |
|---|---|---|---|
| 4,388,893 A | 6/1983 | Apfel | |
| 4,742,810 A | 5/1988 | Anders et al. | |
| 6,164,813 A | 12/2000 | Wang | |
| 6,205,981 B1 | 3/2001 | Lorraine | |
| 6,207,064 B1 | 3/2001 | Gargas | |
| 6,478,857 B2 | 11/2002 | Czabala | |
| 6,606,855 B1 | 8/2003 | Kong et al. | |
| 6,641,625 B1 | 11/2003 | Clawson et al. | |
| 6,804,950 B2 | 10/2004 | Kong et al. | |
| 6,988,033 B1 | 1/2006 | Lowrey et al. | |
| 7,377,272 B2 | 5/2008 | Davidson | |
| 7,430,991 B2 | 10/2008 | VanHoose et al. | |
| 7,621,260 B2 | 11/2009 | Mitani et al. | |
| 7,715,961 B1 | 5/2010 | Kargupta | |
| 7,789,047 B2 | 9/2010 | Kuroki et al. | |
| 7,841,762 B2 | 11/2010 | Oogawara et al. | |
| 7,861,696 B2 | 1/2011 | Lund | |
| 7,882,789 B2 | 2/2011 | Kumar et al. | |
| 7,946,258 B2 | 5/2011 | Adams | |
| 8,176,884 B2 | 5/2012 | Tewari et al. | |
| 8,333,171 B2 | 12/2012 | Lund | |
| 8,377,180 B2 | 2/2013 | Maeda et al. | |
| 8,478,514 B2 | 7/2013 | Kargupta | |
| 8,544,452 B1 | 10/2013 | Galvin et al. | |
| RE45,413 E | 3/2015 | Lund | |
| 9,388,749 B2 | 7/2016 | MacDonald | |
| 9,527,046 B1 | 12/2016 | Roe | |
| 9,586,186 B2 | 3/2017 | Roe | |
| 9,638,136 B2 | 5/2017 | Jung | |
| 9,884,162 B2 | 2/2018 | Kobayashi et al. | |
| 9,945,299 B2 | 4/2018 | Lund | |
| 10,080,998 B2 | 9/2018 | Roe et al. | |
| 10,280,877 B2* | 5/2019 | Hamad | F02M 35/10373 |
| 10,486,114 B2 | 11/2019 | Roe | |
| 10,494,992 B2 | 12/2019 | Johnson et al. | |
| 10,527,013 B2 | 1/2020 | St. Mary et al. | |
| 10,605,162 B2 | 3/2020 | Johnson et al. | |
| 10,746,094 B2 | 8/2020 | Johnson et al. | |
| 10,815,123 B2 | 10/2020 | Northrop | |
| 10,920,717 B1 | 2/2021 | Owens | |
| 11,239,479 B2 | 2/2022 | Katikaneni et al. | |
| 11,247,014 B2 | 2/2022 | Koizumi et al. | |
| 11,598,276 B1 | 3/2023 | Klingbeil et al. | |
| 12,134,990 B2* | 11/2024 | Petterson | F02D 19/0678 |
| 2002/0127445 A1 | 9/2002 | Carpenter et al. | |
| 2004/0101795 A1 | 5/2004 | Fairfull | |
| 2006/0288869 A1 | 12/2006 | Warren et al. | |
| 2007/0020568 A1 | 1/2007 | Finley | |
| 2007/0033929 A1 | 2/2007 | Telford et al. | |
| 2008/0223332 A1* | 9/2008 | Maro | F02B 43/10 123/25 R |
| 2008/0223344 A1 | 9/2008 | Suzuki et al. | |
| 2008/0245318 A1 | 10/2008 | Kuroki et al. | |
| 2009/0012698 A1 | 1/2009 | Shinagawa et al. | |
| 2010/0228415 A1 | 9/2010 | Paul | |
| 2010/0294994 A1 | 11/2010 | Basini et al. | |
| 2011/0023853 A1 | 2/2011 | Lund | |
| 2011/0061622 A1 | 3/2011 | Lund | |
| 2012/0037098 A1 | 2/2012 | Wey | |
| 2012/0186560 A1 | 7/2012 | Lund | |
| 2013/0175201 A1 | 7/2013 | Caliga et al. | |
| 2013/0269243 A1 | 10/2013 | Lund | |
| 2015/0081199 A1 | 3/2015 | Chauncey et al. | |
| 2015/0114351 A1 | 4/2015 | Lund | |
| 2015/0136047 A1 | 5/2015 | Hou | |
| 2015/0226113 A1 | 8/2015 | Alexander et al. | |
| 2016/0362114 A1 | 12/2016 | Chauncey et al. | |
| 2019/0085802 A1 | 3/2019 | St. Mary et al. | |
| 2019/0145327 A1 | 5/2019 | Gieger et al. | |
| 2020/0061549 A1 | 2/2020 | Roe | |
| 2021/0101110 A1 | 4/2021 | Rheaume et al. | |
| 2021/0131361 A1 | 5/2021 | Turner et al. | |
| 2022/0325684 A1* | 10/2022 | Lawhorn | F02M 27/00 |
| 2023/0268538 A1 | 8/2023 | Wiekamp | |
| 2023/0340919 A1 | 10/2023 | Mercal et al. | |
| 2023/0417198 A1 | 12/2023 | Lund | |

FOREIGN PATENT DOCUMENTS

| | | |
|---|---|---|
| DE | 102029213283 A1 | 3/2021 |
| EP | 1883750 B1 | 2/2008 |
| WO | 2006126341 A2 | 11/2006 |
| WO | 2007062217 A2 | 5/2007 |
| WO | 2008125976 A2 | 10/2008 |
| WO | 2014039663 A2 | 3/2014 |
| WO | 2017004551 A1 | 1/2017 |
| WO | 2017205681 A1 | 11/2017 |
| WO | 2022096718 A1 | 5/2022 |
| WO | 2023154174 A1 | 8/2023 |

OTHER PUBLICATIONS

NissanConnect Services Remote Engine Start/Stop, Nissan, 2022, 4 pages, https://web.archive.org/web/20221203160155/https://www.nissanusa.com/connect/features-apps/remote-engine-start.html.

United States International Searching Authority, Invitation to Pay Additional Fees for International Application No. PCT/US2024/017795, mailed May 30, 2024, 2 pages.

United States International Searching Authority, International Search Report and Written Opinion for corresponding International Application No. PCT/US2023/035695, mailed Feb. 7, 2024, 12 pages.

United States International Searching Authority, International Search Report and Written Opinion for corresponding International Application No. PCT/US2023/037208, mailed Feb. 22, 2024, 10 pages.

Green Car Congress, Hydrogen-Enhanced Combustion Engine Could Improve Gasoline Fuel Economy by 20% to 30%, Nov. 5, 2005, https://www.greencarcongress.com/2005/11/hydrogenenhance.html, 2 pages.

Lee et al., Plasma Assisted Hydrogen Generation: A Mechanistic Review, Fuel Processing Technology 247 (2023) 107761, 16 pages.

United States International Searching Authority, International Search Report and Written Opinion for corresponding International Application No. PCT/US2023/081154, mailed Mar. 28, 2024, 12 pages.

United States International Searching Authority, International Search Report and Written Opinion for corresponding International Application No. PCT/US2023/081152, mailed Apr. 29, 2024, 13 pages.

* cited by examiner

SYSTEM AND METHOD FOR USING CONCENTRATED OXYGEN FOR GAS INTAKE INTO AN INTERNAL COMBUSTION ENGINE

RELATED APPLICATION

The present application claims priority to U.S. Provisional Patent Application Ser. No. 63/476,461, of same title, filed Dec. 21, 2022, the entire disclosure of which is incorporated herein by reference in its entirety.

TECHNICAL FIELD

The present invention relates to systems for improving combustion efficiency in engines including gasoline, diesel and hydro-diesel engines by producing concentrated oxygen gas that is supplied into the combustion chamber.

BACKGROUND OF THE INVENTION

A conventional four cycle gasoline engine operates on a mixture of air and gasoline fuel which is combined by a carburetor and received into the combustion chamber of an engine as the piston recedes/moves downwardly (i.e.: the "intake cycle"). The combustion exhaust gases are later expelled from the combustion chamber after combustion has occurred as the piston moves upwards (i.e.: the "exhaust cycle"). Prior to the exhaust cycle, the air/fuel mixture that is brought into the combustion chamber heats up as the piston moves upwards (i.e.: the "compression cycle") thereby compressing the air. At or near top dead center of the piston's compression cycle, a spark is generated by a spark plug that is controlled by a distributor. The spark ignites the air/fuel mixture in the combustion chamber, forcing the piston back downwards (i.e.: the "power cycle"). When the piston moves upwards again, the exhaust valve opens thereby expelling the exhaust gasses as the exhaust cycle is repeated. These cycles repeat continuously.

Operation of a conventional diesel engine is similar to that of the standard gasoline engine described above. Specifically, a four cycle diesel engine brings air into the combustion chamber as the piston moves downwards (the "intake cycle"). As the piston moves back upwards it compresses the air (the "compression cycle") which causes the air to increase in temperature. At or near top dead center of the piston's travel, diesel fuel is injected under high-pressure into the combustion chamber. The diesel fuel spontaneously ignites due to the heat of the compressed air. This combustion forces the piston downwards (the "power cycle"). As the piston moves back upwards (the "exhaust cycle") the exhaust valve opens expelling the exhaust gases.

In both the cases of the standard gasoline engine and the standard diesel engine described above, the air that is brought into the combustion chamber is ambient air that consists of about 24% oxygen and 75% nitrogen. During combustion the nitrogen within the ambient air reacts with the oxygen to form nitrous oxides. Unfortunately, nitrous oxides are an undesirable pollutant which are always produced by the operation of standard internal combustion engines. Although the efficiencies of combustion engines can be quite good, improvements are always desired to further increase the efficiency of the combustion process. Ideally, such improvements would enhance engine combustion efficiency in a manner that also decreases pollution and the production of unwanted gasses from the engine. As will be shown, the present system both increases internal combustion engine efficiency and decreases pollution from the engine, specifically by reducing the formation of nitrous oxides.

SUMMARY OF THE INVENTION

The present invention provides methods and systems for enhancing fuel combustion in an internal combustion engine by using an oxygen concentrator to remove nitrogen from the air to produce a concentrated oxygen gas that is fed into the gas intake of the engine's combustion chamber. The engine itself may be a standard gasoline engine, a diesel engine or a hydro-diesel engine. In all of these various embodiments, the concentrated oxygen gas and liquid diesel or gasoline fuel are combusted within the combustion chamber. In various hydro-diesel embodiments described herein, hydrogen gas is also mixed into the liquid diesel fuel to form a homogeneous mixture of hydrogen gas and liquid diesel fuel entering the combustion chamber. Filler gases may also be added into the combustion chamber.

In one preferred aspect, the present system provides a method of enhancing fuel combustion in an engine, comprising:
 (a) providing an engine having,
  (i) a combustion chamber,
  (ii) a gas intake into the combustion chamber,
  (iii) a fuel intake into the combustion chamber, and
  (iv) a gas exhaust out of the combustion chamber;
 (b) providing an oxygen concentrator, wherein the oxygen concentrator receives air therein and removes nitrogen from the air to produce a concentrated oxygen gas;
 (c) supplying the concentrated oxygen gas through the gas intake into the combustion chamber;
 (d) supplying liquid fuel into the combustion chamber; and
 (e) combusting the concentrated oxygen gas and liquid fuel in the combustion chamber.

In preferred aspects, the engine is a vehicle engine, for example, an engine for a car, bus, locomotive or other transportation system. In such embodiments, the fuel is provided from an onboard fuel tank, the oxygen concentrator is also an onboard device and in optional hydro-diesel embodiments, the hydrogen source is also onboard the vehicle. Such onboard hydrogen source may be an onboard hydrogen tank, an onboard electrolysis system or an onboard reformer system.

In various preferred aspects, (a) the engine is a gasoline engine and the liquid fuel is gasoline, (b) the engine is a diesel engine and the liquid fuel is diesel fuel, or (c) the engine is a hydro-diesel engine and the liquid fuel is diesel fuel, wherein the method further comprises mixing hydrogen gas into the liquid diesel fuel to form a homogeneous mixture of hydrogen gas and liquid diesel fuel entering the combustion chamber.

In preferred embodiments, the oxygen concentrator may optionally be: (a) a pressure swing adsorption-type (PSA-type) oxygen concentrator; (b) an oxygen concentrator that uses zeolites to absorb nitrogen from ambient air; (c) an oxygen concentrator that uses membrane gas separation to separate and remove nitrogen from the ambient air; or (d) any other suitable oxygen concentrator. Preferably, such oxygen concentration produces oxygen at a concentration of greater than 50%, or more preferably greater than 90%.

In other preferred aspects, the present system provides a system for enhancing fuel combustion in an engine, comprising:
 (a) an engine having, (i) a combustion chamber,
(ii) a gas intake into the combustion chamber,
(iii) a fuel intake into the combustion chamber, and
(iv) a gas exhaust out of the combustion chamber;
(b) an oxygen concentrator, wherein the oxygen concentrator receives air therein and removes nitrogen from the air to produce a concentrated oxygen gas that is fed into the gas intake into the combustion chamber; and
(c) a liquid fuel source, wherein the liquid fuel is fed into the combustion chamber.

In various hydro-diesel embodiments, the system further comprises: (d) a hydrogen gas source, wherein the hydrogen gas is mixed into the liquid diesel fuel to form a homogeneous mixture of hydrogen gas and liquid diesel fuel entering the combustion chamber.

Optionally, systems are also provided for directing exhaust gasses from the combustion chamber back into the combustion chamber through a return line; and for adding a filler gas into the combustion chamber.

As will be shown herein, the system and method of the present invention reduces the formation of the nitrous oxides producing a much more environmentally beneficial engine. This is due to the fact that the present system replaces the ambient air that is normally brought into the combustion chamber through the intake valve with concentrated oxygen gas. Oxygen concentrators are typically used for medical issues and for industrial uses. Oxygen concentrators can remove upwards of 95% of the nitrogen from air which results in the oxygen concentration leaving the concentrator at upwards of 90%. With essentially no nitrogen entering the present combustion chamber, there is minimal nitrogen in the combustion chamber to react with the oxygen during combustion. As such, minimal to zero amounts of nitrous oxides are formed in the combustion chamber and vented with the exhaust gasses. A further benefit of the present system is that there is no need to carry a primary source for the oxygen (e.g.: bottled oxygen or pure water for an electrolysis system). Instead, the input to the oxygen concentrator is open and freely available ambient air which avoids the costs of having to continuously replenish the oxygen gas source during system operation.

In the present system, the oxygen concentrator is used to provide concentrated oxygen gas directly into the combustion chamber such that the percentage of oxygen received into the combustion chamber is higher than would be the case if ambient air were used instead. The present use of an oxygen concentrator significantly reduces the amount of nitrous oxide pollution released by the engine, regardless of whether the engine is a standard gas engine, a diesel fuel engine, or a hydro-diesel engine.

The flow of concentrated oxygen gas is fed through an intake valve into the combustion chamber. This is preferably done at a sufficiently high flow volumes such that an adequate volume of concentrated oxygen gas meets the oxygen demands of the internal combustion engine. In optional aspects, an auxiliary oxygen buffer tank can be included to store a quantity of oxygen such that there is sufficient oxygen available to the engine when a momentary increased oxygen demand (or reduced demand) is experienced such as during immediate acceleration or deceleration. In addition, auxiliary gas intake devices, including but not limited to filters, blowers, etc. can all be included as desired are within the scope of the present system.

In additional optional embodiments, the exhaust gasses from the combustion chamber may be re-directed back into the combustion chamber. This may occur, for example, when the quantity of oxygen that is required for system operation is less than the amount of concentrated oxygen gas being delivered from the oxygen concentrator to the combustion chamber; for example, during operation where demands on the engine are low. At these times, not all of the oxygen delivered to the combustion chamber will be fully combusted in the combustion reaction. Accordingly, by diverting the exhaust gasses back into the combustion chamber, unused oxygen in the exhaust can be used again. In addition, any $CO_2$ in the exhaust gasses that is diverted back into the intake of the combustion chamber will be non-reactive and pass through the system. Flow data is collected and flow valves maintained by a controller to insure the proper $CO_2$ flow volumes are added or reduced when passed to the gaseous intake port of the combustion chamber for optimum combustion efficiency. In an optional embodiment, an exhaust buffer tank is used to provide a storage buffer for the exhaust gasses to accommodate the demands of the combustion chamber: for example, when the volume of gasses returning to the combustion chamber needs to be periodically adjusted. In further optional embodiments, non-reactive (a.k.a. "filler") gasses such as helium or $CO_2$ can be added to the combustion chamber to manage the intake gas volume demands while managing the oxygen concentration demands. In addition and in lieu of using concentrated oxygen, the present invention also includes using bottled oxygen or oxygen derived from the electrolysis separation of oxygen from water as the intake gas.

In preferred aspects, the present system provides a method of enhancing diesel fuel combustion to improve combustion and to reduce pollution from an internal combustion engine, comprising: (a) providing an internal combustion engine having: (i) a combustion chamber; (ii) a gaseous intake into the combustion chamber, (iii) a fuel intake for passing fuel into the combustion chamber, and (iv) a gas exhaust out of the combustion chamber; (b) providing an oxygen concentrator configured to remove nitrogen from input ambient air to supply a flow of concentrated oxygen gas; (c) supplying the flow of concentrated oxygen gas through the gaseous intake into the combustion chamber; (d) supplying liquid diesel fuel into the combustion chamber; and (e) igniting the mixture of concentrated oxygen gas and liquid diesel fuel in the combustion chamber.

As described herein, the present system uses an oxygen concentrator to supply an increased concentration of oxygen into the combustion chamber. The present choice of an oxygen concentrator yields the dual benefits of both increasing combustion efficiency and reducing pollution from the engine. In addition, these dual benefits occur in the cases of standard gasoline, or other fuel, engines, diesel engines and hydro-diesel engines. These benefits as a result of the oxygen concentrator use are a non-obvious choice to a person skilled in the art.

DETAILED DESCRIPTION OF THE DRAWINGS

Figure 1:
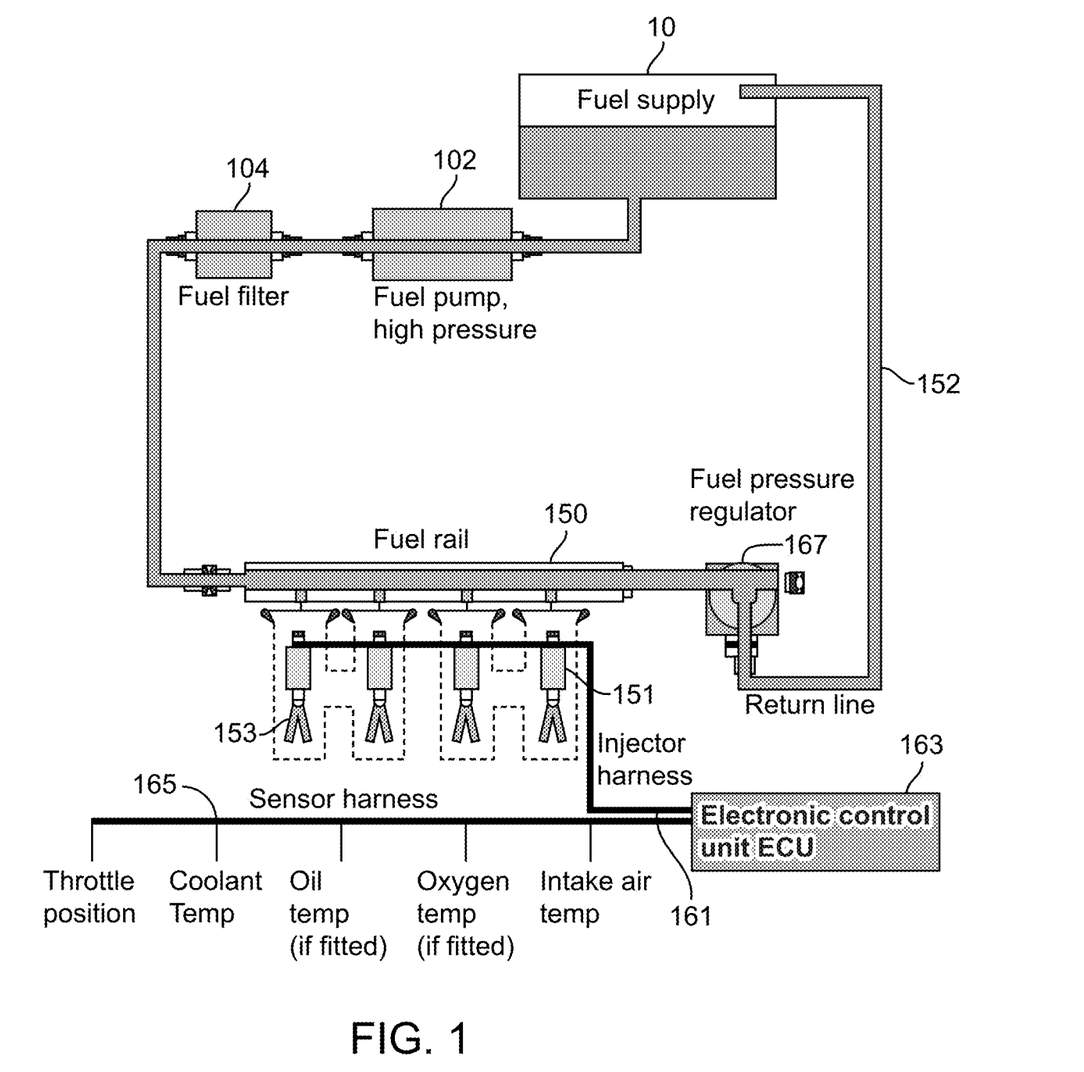
FIG. 1 shows a conventional diesel engine.

FIG. 1 shows a conventional diesel engine having a fuel supply 10, a high pressure fuel pump 102, and an optional fuel filter 104. The fuel is passed to the fuel rail 150 at high pressure. The fuel is passed from the fuel rail 150 through the injectors 151 into the combustion chamber 153. The injectors 151 are controlled via the injector harness 161 from an injector controller 163. FIG. 1 also shows an engine sensor harness 165 that monitors various engine parameters that permit the controller 163 to signal activation of the injectors 151. In addition, FIG. 1 shows an optional fuel pressure regulator 167 that controls the feedback return line 152 through which unused fuel is returned to the fuel supply 10.

Figure 2:
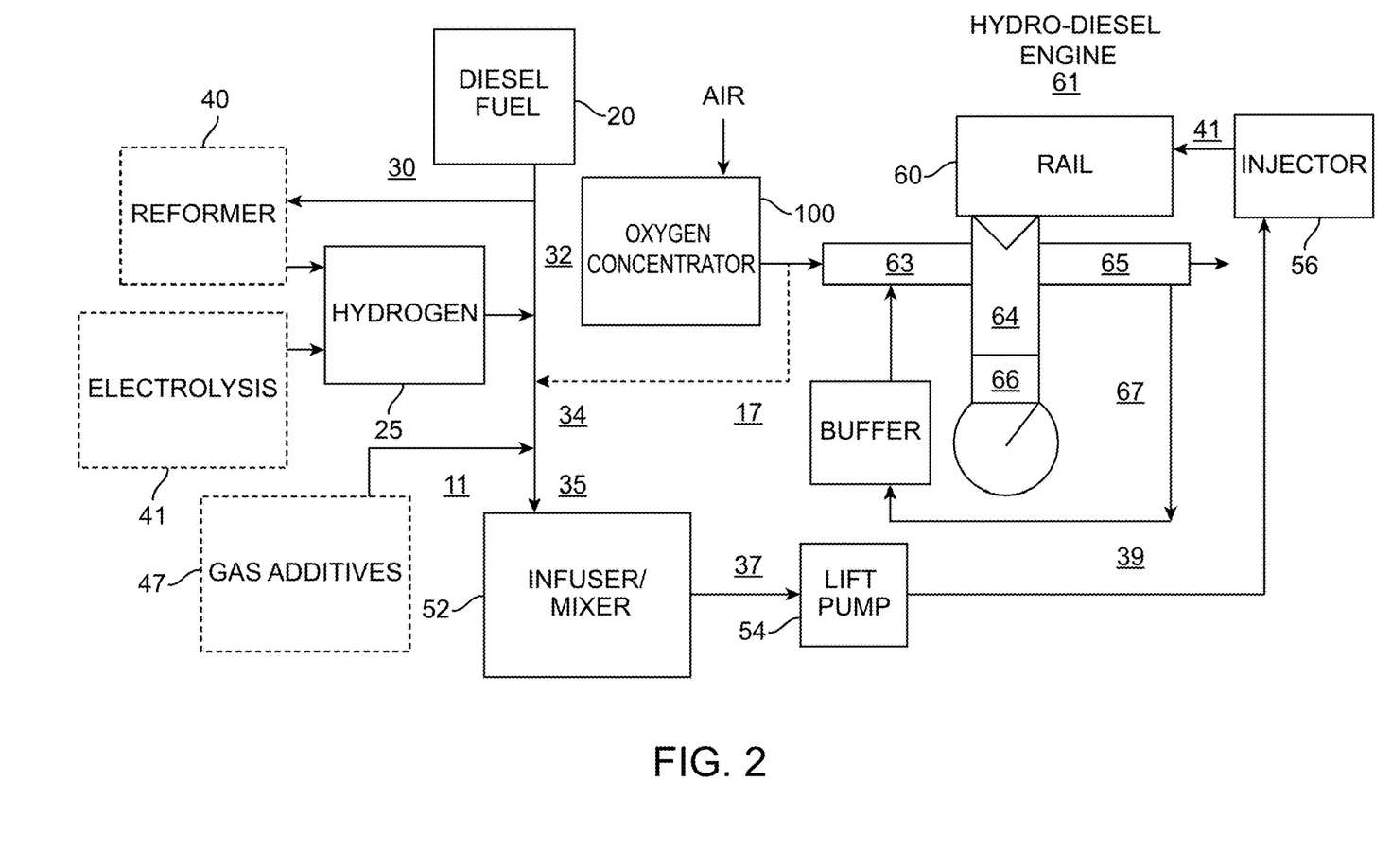
FIG. 2 shows a schematic of the present system of using an oxygen concentrator to supply concentrated oxygen gas flow into the combustion chamber of a hydro-diesel (or diesel) engine.

FIG. 2 illustrates the present system for enhancing the efficiency of diesel combustion and reducing air pollution in a hydro-diesel engine. It is to be understood that this system can also be used in a standard diesel engine (but with some of the components of FIG. 2 being omitted, as will be further explained).

The present system provides a method of enhancing fuel combustion in an engine, comprising:
 (a) providing an engine 61 having,
  (i) a combustion chamber 64,
  (ii) a gas intake 63 into combustion chamber 64,
  (iii) a fuel intake into the combustion chamber, and
  (iv) a gas exhaust 65 out of combustion chamber 64;
 (b) providing an oxygen concentrator 100, wherein the oxygen concentrator receives air therein and removes nitrogen from the air to produce a concentrated oxygen gas;
 (c) supplying the concentrated oxygen gas through the gas intake 63 into the combustion chamber 64;
 (d) supplying liquid fuel (from diesel fuel tank 20) into the combustion chamber 64; and then
 (e) combusting the concentrated oxygen gas and liquid fuel in combustion chamber 64.

As illustrated, engine 61 is a hydro-diesel engine and the liquid fuel is diesel fuel from source (e.g.: diesel fuel tank) 20. In this embodiment, hydrogen gas from source 25 is mixed into the liquid diesel fuel to form a homogeneous mixture of hydrogen gas and liquid diesel fuel which eventually enters the combustion chamber. Such mixing preferably takes place within infuser/mixer 52. In embodiments where engine 61 is a standard diesel engine instead, there is no source of hydrogen 25 or infuser/mixer 52. (IE: elements 25 and 52 are removed). Instead, the diesel fuel from tank 20 is simply pumped from tank 20 and then injected into engine 61 where it mixes with concentrated oxygen gas from concentrator 100 in combustion chamber 64.

Returning to the illustrated hydro-diesel embodiment of FIG. 2, hydrogen gas from source 25 is mixed into the liquid diesel fuel in infuser/mixer 52 to form a homogeneous mixture of hydrogen gas and liquid diesel fuel. Next, a lift pump 54 can be used to pump the homogeneous mixture of hydrogen gas and liquid diesel fuel into an injector 56 which then sends the mixture through a common rail 60 and into the engine's combustion chamber 64. In preferred aspects, the mixing of hydrogen gas and liquid diesel fuel may occur within infuser/mixer 52, somewhat upstream of infuser/mixer 52, or both. In addition, some hydrogen gas may optionally be stored within the diesel fuel tank 20 itself to promote chemical mixing of the hydrogen gas into the liquid diesel fuel prior to the engine even being turned on.

It is also to be understood that the present infuser/mixer 52 may comprise any suitable infusion or mixing system known to persons skilled in the art. Examples of suitable infusers and mixing systems can also be found in Applicant's co-pending Patent Application PCT/US23/35695, entitled METHOD AND DEVICES COMBINING DIESEL FUEL AND HYDROGEN GAS TO FORM A HOMOGENIZED LIQUID HYDRO-DIESEL FUEL, filed Oct. 23, 2023, the entire disclosure of which is incorporated herein by reference in its entirety for all purposes.

In optional aspects, the hydrogen $H_2$ in tank 25 is simply supplied by bottled hydrogen in a tank. In other optional aspects, however, the hydrogen in tank 25 can be supplied into tank 25 using other systems such as an electrolysis system 41 (shown in dotted lines) or a reformer 40 (also shown in dotted lines). Examples of suitable reformers 40 are found in Applicant's co-pending Patent Application PCT/US2023/037208, entitled System and Method for Producing Hydrogen Gas from Diesel Fuel Using a Reformer or Other Hydrogen Gas Production System and for Mixing the Hydrogen Gas Back into the Liquid Diesel Fuel Prior to Sending the Liquid Diesel Fuel into a Hydro-Diesel Engine, filed Nov. 13, 2023, the entire disclosure of which is incorporated herein by reference in its entirety for all purposes.

In accordance with the present system, passing the homogeneous mixture of liquid diesel fuel and hydrogen gas into the combustion chamber of an engine comprises:
 providing a lift pump 54 and an injector 56;
 using the lift pump 54 to pump the homogeneous mixture of liquid diesel fuel and hydrogen gas from the infuser or mixer 52 into the injector 56; and then
 using the injector 56 to inject the homogeneous mixture of liquid diesel fuel and hydrogen gas into:
  (i) the combustion chamber 66 of the engine 61, or
  (ii) a common rail 60 leading into the combustion chamber 64 of the engine 61.

In preferred aspects, the oxygen concentrator 100: (a) is a pressure swing adsorption-type (PSA-type) oxygen concentrator, (b) uses zeolites to absorb nitrogen from ambient air, or (c) uses membrane gas separation to separate and remove nitrogen from the ambient air. Preferably, the concentrated oxygen gas has an oxygen concentration of greater than 50%, and most preferably greater than 90%.

Preferably, engine 61 is vehicle engine (for example, a car, bus, train, locomotive, or other transportation system engine) and liquid diesel source 20, oxygen concentrator 100 and optional hydrogen source 25 are all stored onboard the vehicle.

In any of the above cases, and in accordance with the present system, the mixing of hydrogen gas into the liquid diesel fuel to form a homogeneous gas/fuel mixture at 34 is carried out by bubble injecting the hydrogen gas into the liquid diesel within the infuser/mixer 52. The hydrogen-fuel mixture can be thoroughly mixed within infuser/mixer 52 to form a homogenous mixture of hydrogen gas bubbles in liquid diesel fuel, leaving the infuser/mixer 52 at path 37. Next, the mixture is pressurized to thereby compress the hydrogen gas bubbles distributed throughout the diesel fuel by lift pump 54 which reduces the size of the hydrogen bubbles in the homogenous mixture of hydrogen gas in the diesel fuel mixture.

The homogenized mixture of hydrogen gas and diesel fuel is then passed to common rail 60 by injection pump 56 through path 41. Next, the high pressure homogenized hydrogen/fuel mixture is then injected into combustion chamber 64 in engine 61. Concentrated oxygen gas from concentrator 100 is drawn into the combustion chamber 64 through valve or path 63 on the piston's 66 inwardly movement. From the common rail 60, the high pressure homogenized hydrogen-fuel mixture is atomizedly injected into the combustion chamber 64 as the piston 66 reaches top dead center. The piston 66, on its outward movement, compresses the concentrated oxygen gas within combustion chamber 64 resulting in heated air having a sufficiently high temperature to spontaneously combust the gas-fuel mixture when injected therein.

Oxygen Concentrators come in different configurations, and the present system is not limited to any one form of oxygen concentrator 100. Oxygen concentrators have been used to provide oxygen rich air for patients with various medical conditions.

One example of an oxygen concentrator that is suitable with the present system is seen in U.S. Pat. No. 8,377,180. This patent reference is incorporated herein by reference. This oxygen concentrator is a pressure swing adsorption-type (PSA-type) oxygen concentrator, which produces a highly concentrated oxygen gas by introducing compressed air from a compressor into an adsorption cylinder filled with an adsorbent such as zeolites and the like selectively adsorbing a nitrogen gas to eliminate selectively a nitrogen gas in the air. First, compressed air is supplied by a compressor into an adsorption cylinder to adsorb a nitrogen gas contained in air by an adsorbent such as zeolites and the like. The oxygen concentration in air is increased by selective adsorption and elimination of a nitrogen gas. A small amount of concentrated oxygen gas may also be supplied into the adsorption cylinder to promote the desorption of nitrogen. Thus, highly concentrated oxygen-enriched air having an oxygen concentration as high as 95% may be obtained from air by repeatedly pressurizing and depressurizing the adsorption cylinder using the PSA-type oxygen concentrator.

Other examples of oxygen concentrators that are suitable with the present system use zeolites to absorb nitrogen. Examples of such systems are found in U.S. Pat. Nos. 11,247,014; 9,884,162 and 6,478,857. These references are incorporated herein by reference in their entireties as well.

Other examples of oxygen concentrators that are suitable with the present system include oxygen concentrators that use membrane gas separation to separate (and remove) the nitrogen in the atmosphere, thereby increasing the percentage of oxygen in the air coming out of the concentrator. It is to be understood that the present system encompasses any and all configurations and systems of oxygen concentrators without limitation.

The pressurized liquid diesel fuel and hydrogen gas mixture in the common rail 60 is preferably atomized into small droplets when injected into the combustion chamber 64. Each droplet is imbedded with tiny compressed bubbles of hydrogen. As these minute fuel and gas mixture droplets experience the decreased pressure inside of the combustion chamber the bubbles immediately experience a rapid volumetric expansion further particulating the fuel droplets, increasing the diesel fuel surface area thereby permitting the more complete combustion of the fuel. The droplets of fuel and expanding hydrogen gas bubbles force a rapid expansion throughout combustion chamber 64 where the pressure and the heat the tiny droplets of diesel fuel together with the concentrated oxygen gas received from the air intake contribute to a more through and complete combustion.

A further consequence of injecting the hydrogen-fuel mixture into the combustion chamber 64 as part of the fuel mixture results an earlier combustion due to the lower flash point of hydrogen relative to diesel fuel. The lower hydrogen flash point causes the hydrogen to combust earlier which contributes to an earlier increase in heat causing the diesel fuel to ignite earlier and more completely. In addition and because the diesel fuel has experience additional particulation with greater surface area, the diesel fuel experiences a more complete combustion and increase in energy release, thereby increasing the combustion efficiency.

In addition, the hydrogen within the hydrogen-fuel mixture is being infused and adsorbed into the structure of the hydrocarbons that are carried directly into the combustion chamber as compressed gaseous molecules or ionic hydrogen atoms with the injected fuel. It therefore does not carry the major shortcoming of air-intake induction of hydrogen into the combustion chamber, which effectively displaces (at stoichiometric conditions) combustion chamber air content (and the benefits of the oxygen).

As such, the hydrogen added during the infusion process is not merely mixed or blended. Through a sequence of chemical processes, the H ions chemically repack and are adsorbed into the molecular structure of the hydrocarbons forming a more combustible long chain hydrocarbon. At the heart of the hydrodiesel infusion system is the differential chemical reaction between the injected molecular hydrogen and the bonded hydrogen atoms of the various fractions of diesel fuel. The reaction appears to consist of several components: (a) the selective hydrogenolysis, or bond dissociation, of unsaturated double-bond aromatics, liberating an additional volume (approximately 2×) of hydrogen [fractional changes]: (b) the selective hydrogenation, or adsorption, of injected and liberated hydrogen atoms onto accessible carbon atoms in the single-bond long chain saturated isoparaffinics [molar changes]; and (c) the retention of a volume of liberated ionic hydrogen and injected hydrogen molecules in highly pressurized gaseous form, and thus immediately available in that form at the moment of flame propagation [combustion changes]. Therefore the hydrogen reaction process is another source of the observed fuel efficiency is a product of a significantly enhanced fuel combustion sequence.

Two principal sources of improved combustion efficiency can include: (a) the induced turbulence, spray, and distributional effects, and (b) the enhanced combustion physics, as follows.

(a) Enhanced Turbulence: The physics of sudden gaseous expansion of gaseous bubbles is a novel variable in the combustion equation, directly affecting the event in several ways. First, the kinetic gas expansion physically propels bubbles independently, thereby altering the spray configuration and, just prior to ignition, magnifying and compounding the normal, and desirable, boundary turbulence and distribution critical to complete fuel consumption, fuel efficiency, and minimization of unburnt exhaust emissions. At a minimum, the gaseous kinetics function to induce added expansive precombustion turbulence, ensuring a significant increase in surface area and, hence, high propagation speed and a sharp increase in cylinder pressure.

The gaseous bubbles are also not burning in the same manner, or at the same time, or at the same place as the bonded gaseous bubbles. Their action, however, is directly affecting the expansion and stratification characteristics of flame propagation, increasing the surface area of the flame, the burn velocity, and the penetration of the burn throughout the chamber. The burn efficiency of the combustion event improves at each phase, from ignition initiation through bloom and decay. In sum, the gaseous bubbles, undergoing explosive expansion at a microscopic scale, combined with liberated ionic H atoms, are effecting a far more powerful, distributed, uniform, and enduring combustion event.

(b) Combustion Effects: The high inertial, heavy mass, diesel hydrocarbon molecule will naturally concentrate near the center of the injection spray, while the large, light weight, rapidly expanding, and suddenly slowing and mixing hydrogen gas molecule (and ionic H atoms) will migrate to the periphery of the spray. Given that the principal chemical transformation of combustion takes place along the thin jet interfacial (boundary) region separating the unburned and the burned gases, this sequence, in theory, places the hydrogen gas at the ideal place at the ideal moment of combustion. It is important to note that the free (not adsorbed) ionic hydrogen produced during the infusion process is more reactive than molecular hydrogen, further accelerating the combustion physics.

In accordance with the present invention, an oxygen concentrator 100 is used to concentrate oxygen gas from the ambient air such that an increased percentage of oxygen can be added directly to the air intake 63 into combustion chamber 64. A portion of the oxygen concentrate 17 may be passed into the diesel fuel line at, for example, 34 where is combines with the diesel fuel and homogenized and compass with other gaseous additives in the mixer 52 for ultimate injection with the diesel fuel into the combustion chamber 64.

In any of the above cases, and in accordance with the present system, the mixing of hydrogen into the diesel fuel to form a gas/fuel mixture 34 can be carried out by injecting bubbles of hydrogen gas into the liquid diesel fuel and mixing other preselected gaseous additives such as oxygen at 35 via line 17. The gaseous additives-oxygen-hydrogen-fuel mixture is thoroughly mixed by mixer/infuser 52 to form a homogenous mixture of gaseous additives-oxygen-hydrogen homogeneous gas bubbles in liquid diesel fuel at 37. Next, the mixture is optionally pressurized to thereby compress the gas bubbles distributed throughout the diesel fuel by, for example by lift pump 54 and ultimately by injection pump 56 whereby such pressure substantially reduces the size of the gas bubbles in the fuel mixture. The homogenized mixture of gaseous additives and diesel fuel at 37 is then passed to common rail 60 by injection pump 56 through line 41. The high pressure homogenized gaseous additives and fuel mixture is then injected into combustion chamber 64 in engine 61 by injector 62.

Air is drawn through oxygen concentrator 100 through air intake 63. The concentrator 100 substantially removes nitrogen resulting in a high concentration of oxygen gas. The concentrated oxygen gas is passed into the combustion chamber 64 through gas intake 63 on the piston's 66 downward movement. The piston 66 then starts it upward movement compressing the mixture of concentrated oxygen. The hydro-diesel fuel is injected under high pressure by injector 62 after the piston 66 has compressed the concentrated oxygen within the combustion chamber 64. The piston 66, on its outward movement, compresses the oxygen within the combustion chamber 64 resulting in the oxygen being heated to a sufficiently high temperature to spontaneously combust the hydrogen-fuel mixture when injected therein by injector 56.

In optional embodiments, the exhaust gasses exiting gas exhaust 65 can optionally be re-directed back into the air intake 63 through return line 67. Optional return line 67 ensures that oxygen that has not been fully combusted in the combustion chamber 64 a first time can be combusted when it passes through the combustion chamber 64 a second time.

Figure 3:
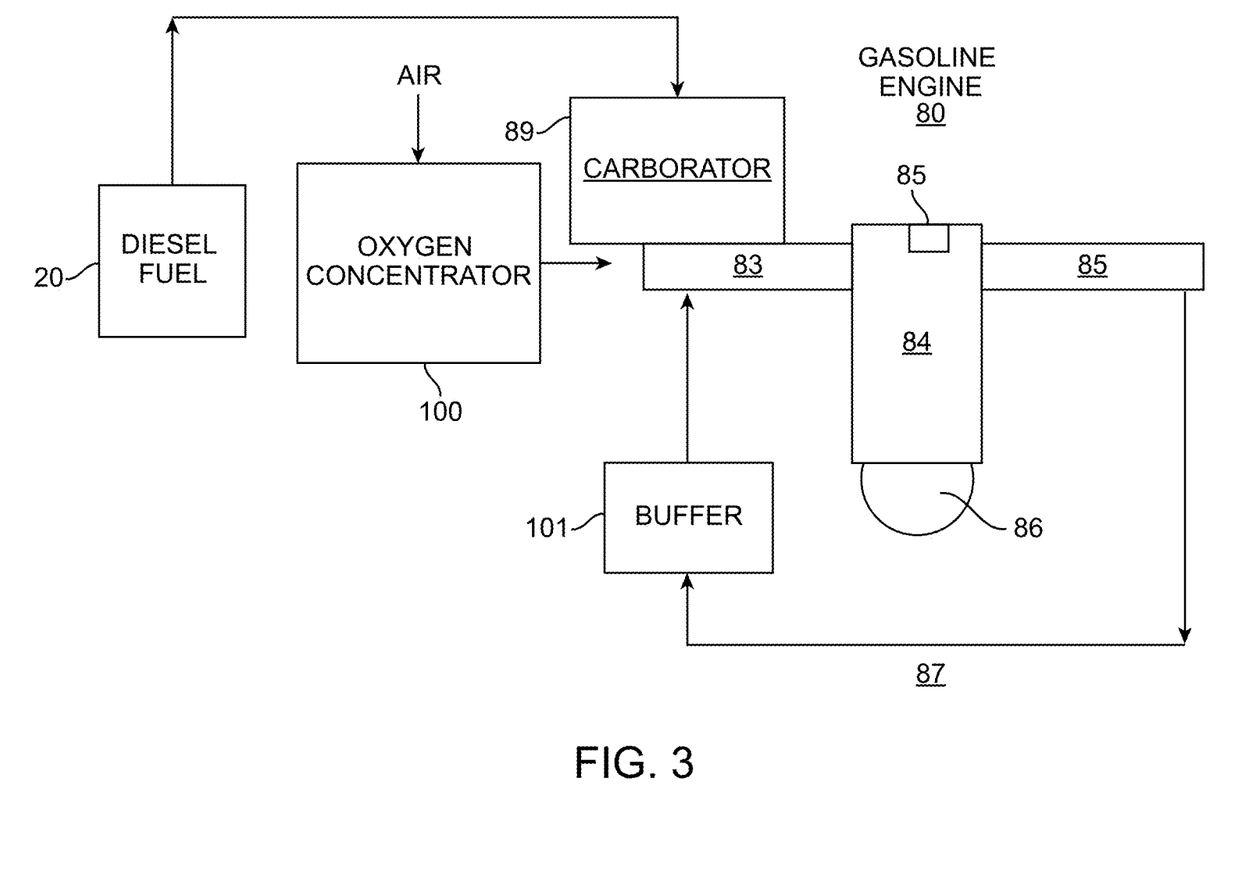
FIG. 3 shows a schematic of the present system of using an oxygen concentrator to supply concentrated oxygen gas flow into the combustion chamber of a conventional gasoline engine.

FIG. 3 is a schematic representation of the present conventional gasoline engine, using an oxygen concentrator to supply increased oxygen concentration for the gas intake flow into the combustion chamber of the conventional gasoline engine 80. FIG. 3 is similar to FIG. 2's hydro-diesel engine, however, the components for injecting hydrogen bubbles into the diesel fuel are not needed. As such, the present system provides a simple and elegant solution to enhancing fuel efficiency and reducing pollution in a standard gasoline engine. In FIG. 3, gasoline engine 80 has its air inlet 83, gas exhaust outlet 85, piston 86, combustion chamber 84 and spark plug 85. Concentrated oxygen is passed into gas intake 83 where is passes through a carburetor 89 that adds gasoline to the oxygen for further transfer into the combustion chamber 84 during the engine's intake cycle. An optional return line 87 can also be provided for returning not fully combusted oxygen and or exhaust gas $CO_2$ to establish proper oxygen concentration to the combustion chamber 84. Exhaust return line 87 may also include buffer tank 101 to accommodate rapid usage changes. It is to be understood that the reference in FIG. 3 to a "gasoline" engine could also encompass other liquid fuel engines burning other liquid fuels besides gasoline, all keeping within the scope of the present invention.

What is claimed is:

1. A method of enhancing fuel combustion in an engine, comprising:
   (a) providing an engine having,
      (i) a combustion chamber,
      (ii) a gas intake into the combustion chamber,
      (iii) a fuel intake into the combustion chamber, and
      (iv) a gas exhaust out of the combustion chamber;
   (b) providing a hydro-diesel system including:
      (i) a diesel fuel source,
      (ii) a hydrogen gas source,
      (ii) an infuser configured to mix hydrogen gas received from the hydrogen gas source into diesel fuel received from the diesel fuel source into a homogeneous mixture of hydrogen gas and liquid diesel fuel;
   (c) providing an oxygen concentrator, wherein the oxygen concentrator receives air therein and removes nitrogen from the air to produce a concentrated oxygen gas;
   (d) supplying the concentrated oxygen gas through the gas intake into the combustion chamber;
   (e) supplying liquid fuel into the combustion chamber; and
   (f) combusting the concentrated oxygen gas and liquid fuel in the combustion chamber.

2. The method of claim 1, wherein the oxygen concentrator is a pressure swing adsorption-type (PSA-type) oxygen concentrator.

3. The method of claim 1, wherein the oxygen concentrator uses zeolites to absorb nitrogen from ambient air.

4. The method of claim 1, wherein the oxygen concentrator uses membrane gas separation to separate and remove nitrogen from the ambient air.

5. The method of claim 1, wherein the oxygen concentration produces oxygen at a concentration of greater than 50%.

6. The method of claim 1, wherein the oxygen concentration produces oxygen at a concentration of greater than 90%.

7. The method of claim 1, further comprising:
   (g) directing exhaust gasses from the combustion chamber back into the combustion chamber through a return line.

8. The method of claim 1, further comprising:
   (g) adding a filler gas into the combustion chamber.

9. The method of claim 1, further comprising:
   (g) sending a first portion of the concentrated oxygen gas from the oxygen concentrator into the combustion chamber, while simultaneously (h) sending a second portion of the concentrated oxygen gas from the oxygen concentrator into the infuser.

10. A system for enhancing fuel combustion in an engine, comprising:
(a) an engine having,
(i) a combustion chamber,
(ii) a gas intake into the combustion chamber,
(iii) a fuel intake into the combustion chamber, and
(iv) a gas exhaust out of the combustion chamber;
(b) a hydro-diesel system including:
(i) a diesel fuel source,
(ii) a hydrogen gas source,
(ii) an infuser configured to mix hydrogen gas received from the hydrogen gas source into diesel fuel received from the diesel fuel source into a homogeneous mixture of hydrogen gas and liquid diesel fuel;
(c) an oxygen concentrator, wherein the oxygen concentrator receives air therein and removes nitrogen from the air to produce a concentrated oxygen gas that is fed into the gas intake into the combustion chamber; and
(d) a liquid fuel source, wherein the liquid fuel is fed into the combustion chamber.

11. The system of claim 10, wherein the oxygen concentrator is a pressure swing adsorption-type (PSA-type) oxygen concentrator.

12. The system of claim 10, wherein the oxygen concentrator uses zeolites to absorb nitrogen from ambient air.

13. The system of claim 10, wherein the oxygen concentrator uses membrane gas separation to separate and remove nitrogen from the ambient air.

14. The system of claim 10, further comprising:
(e) a gas return line running from the gas exhaust out of the combustion chamber to the gas intake into the combustion chamber.

15. The system of claim 10, further comprising:
(e) a filler gas source for adding filler gas into the combustion chamber.

16. The system of claim 10, further comprising:
(e) a first flow path for passing concentrated oxygen gas from the oxygen concentrator to the air intake into the combustion chamber; and
(f) a second flow path for passing concentrated oxygen gas from the oxygen concentrator into the combined diesel fuel and hydrogen gas entering the infuser.

* * * * *